United States Patent [19]

Senussi

[11] 4,308,638
[45] Jan. 5, 1982

[54] APPARATUS FOR SLAUGHTERING IN ACCORDANCE WITH HALLAL OR KOSHER PROVISIONS

[76] Inventor: Akiel Senussi, 6442 Northanna Dr., Springfield, Va. 22150

[21] Appl. No.: 130,001

[22] Filed: Mar. 13, 1980

[51] Int. Cl.³ .............................................. A22B 1/00
[52] U.S. Cl. ..................................... 17/1 A; 119/103
[58] Field of Search ......................... 17/1 A; 119/103

[56] References Cited

U.S. PATENT DOCUMENTS

| | | | |
|---|---|---|---|
| 2,653,347 | 9/1953 | Diekman | 119/103 X |
| 3,191,220 | 6/1965 | Lunde | 17/1 A |
| 3,457,585 | 7/1969 | Edison | 17/1 A |
| 3,590,784 | 7/1971 | Fly | 119/103 |
| 3,970,046 | 7/1976 | Boggs | 119/103 |
| 4,162,685 | 7/1979 | Knappenberger | 119/103 |

FOREIGN PATENT DOCUMENTS

| | | | |
|---|---|---|---|
| 2299814 | 9/1976 | France | 17/1 A |
| 328116 | 4/1930 | United Kingdom | 17/1 A |
| 1493039 | 11/1977 | United Kingdom | 17/1 A |

*Primary Examiner*—Willie G. Abercrombie
*Attorney, Agent, or Firm*—John R. Moses

[57] ABSTRACT

Apparatus for slaughtering animals in accordance with hallal or kosher provisions includes a table with a concave top surface having a drain therein and reeled straps for securing an animal. In one embodiment, the table is motor driven to tilt about one axis in order to secure the animal thereto and about another axis to slide the animal onto a conveyor belt after the animal has been slaughtered.

In another embodiment, the table is equipped with folding legs so that it can be used on ceremonial occasions.

11 Claims, 10 Drawing Figures

APPARATUS FOR SLAUGHTERING IN ACCORDANCE WITH HALLAL OR KOSHER PROVISIONS

BACKGROUND OF THE INVENTION

1. Field of the Invention

The instant invention relates to apparatus for slaughtering livestock, and more particularly, the instant invention relates to apparatus for slaughtering livestock in accordance with hallal and kosher restrictions.

2. General Considerations & Prior Art

Approximately one-sixth of the world's population is Muslim. In accordance with Muslim religious provisions, animals must be slaughtered in a certain way so as to make sure that the meat is clean and that the surroundings are kept clean and not contaminated with blood. Moreover, it is prescribed that the animal's head face Mecca, that the animal's feet be secured and that the animal does not suffer unduly and is treated with respect.

These provisions can be difficult to follow. When the animal is slaughtered in a Muslim's home which is a prevalent practice during holy days and other religious occasions, sanitary problems arise because people do not generally have adequate facilities for slaughtering animals. Accordingly, it is difficult to prevent blood from spilling on the ground or the floor adjacent the slaughter area. Another difficulty arises in commercial processing of meat both in Muslim communities and in countries such as the United States and Australia which provide meat for export to Muslim countries. Consequently, meat which is processed in accordance with hallal provisions is more expensive than it need be because the slaughtering process is slow and antiquated.

The prior art recognizes these problems and the following patents are illustrative of attempted solutions to these problems: British Pat. 328,116—April 1930; British Pat. No. 784,278—October 1957; U.S. Pat. No. 2,967,510—January 1961; U.S. Pat. No. 3,457,585—July 1969. In accordance with the inventions disclosed in these patents, the animal is tied to the table manually while standing. The table is then tilted to a horizontal position for slaughter. However, these tables are operated manually which can require an enormous great effort since animals such as sheep and cows can be extremely heavy. Moreover, no drain is provided for collecting the blood, and accordingly, blood runs all over the table and is usually caught in a container and carried away by hand. In addition, the tables are generally too low for the person doing the slaughtering to stand comfortably so that the animal's jugular vein can be cut cleanly and rapidly, insuring that the animal dies quickly and relatively painlessly. Furthermore, it is readily apparent that the devices taught by these prior art patents are not conducive to mass production procedures.

SUMMARY OF THE INVENTION

In view of the aforementioned considerations, it is a feature of the instant invention to provide new and improved apparatus for slaughtering animals in accordance with hallal and kosher provisions.

In view of this feature and other features, the instant invention contemplates apparatus including a table top for restraining an animal to be slaughtered wherein the table top includes a concave surface, a drain communicating with the concave surface and a plurality of straps secured at one end to the table and latchable at the other end for securing an animal to the table. In accordance with one embodiment of the invention, the table has foldable legs for use in low volume situations such as a home. In accordance with another embodiment of the invention, the table top is mounted on supports and is tilted from a horizontal orientation to a vertical orientation for securing an animal thereto and from the vertical orientation to a horizontal orientation for slaughtering the animal. In addition, the table is tiltable to another orientation having a vertical component in order to slide the animal therefrom.

DESCRIPTION OF THE PREFERRED EMBODIMENT

Figure 1:
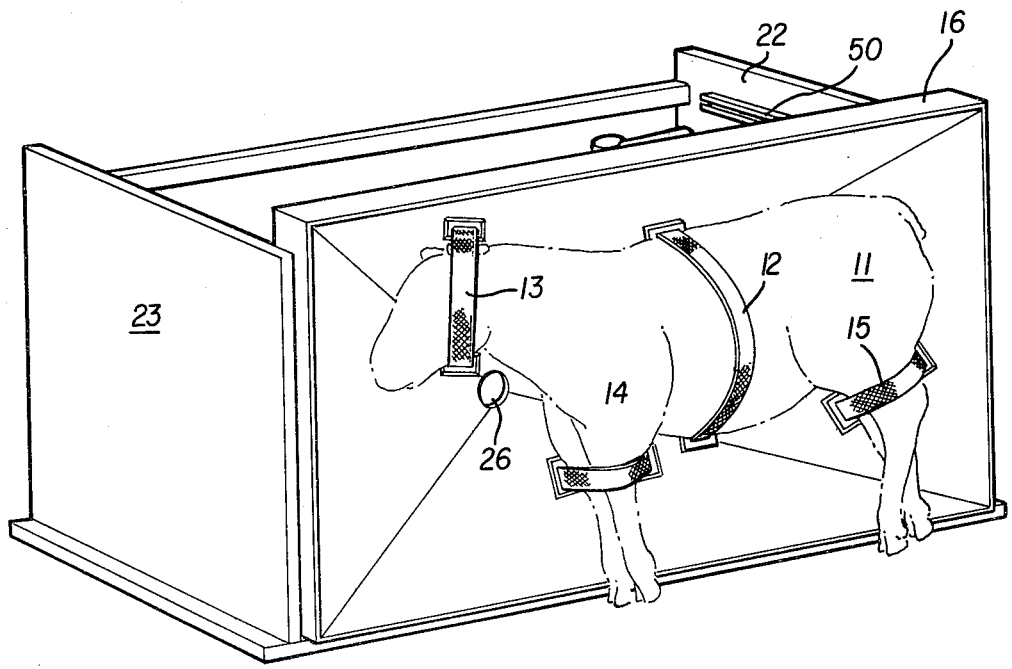
FIG. 1 is a perspective view of the apparatus of the unit instant invention showing a table top positioned in a horizontal orientation for slaughtering livestock.

Referring now to FIG. 1, there is shown a livestock slaughtering apparatus, designated generally by the numeral 10, showing an animal 11 secured by straps 12, 13, 14 and 15 to a table top 16. The table top 16 is mounted within a cradle, designated generally by the numeral 20, and including a base 21, a rear support 22 and a front support 23. The table top 16 has a top surface 24 which is generally concave or at least has a concave portion 25 which has a drain hole 26 at its lowest point. When an animal is slaughtered, the animal's jugular is severed and the blood runs down the drain 26 where it can be collected in a container or perhaps drained away to some other point.

Figure 2:
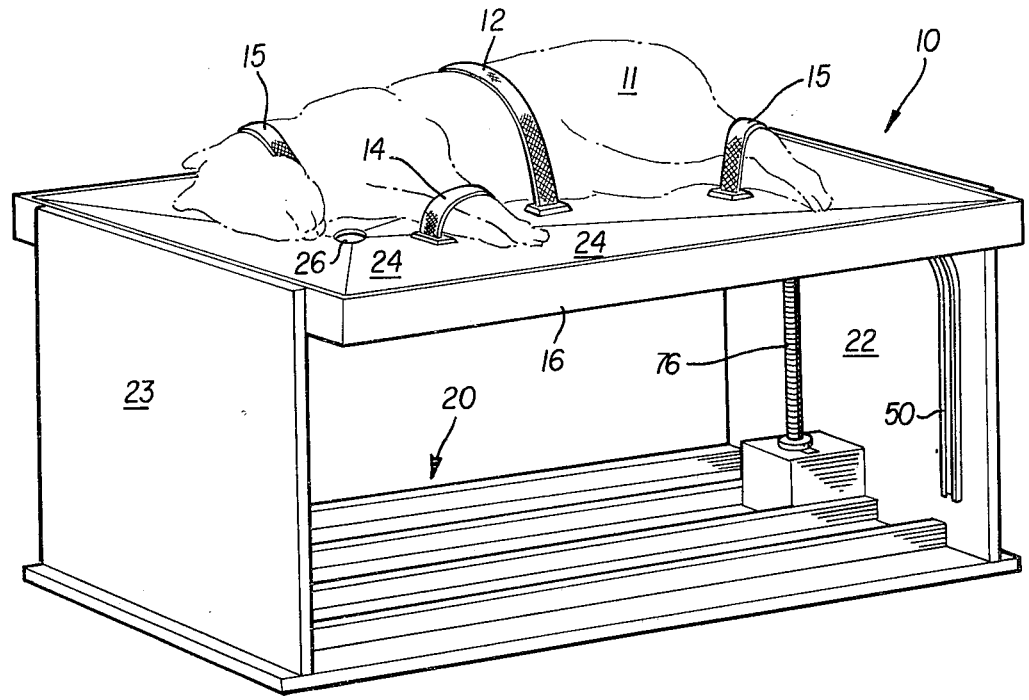
FIG. 2 is perspective view of the apparatus of FIG. 1 tilted about a first axis so as to position the table top in a vertical orientation to facilitate securing the livestock thereto with a plurality of straps.

As is seen in FIG. 2, the table top 16 can be tilted from the horizontal orientation shown in FIG. 1 to a vertical orientation so that the animal 11 can be rapidly and conveniently secured thereto. In operation, the animal is enticed to stand in juxtaposition with the table top and the straps 12, 13, 14 and 15 are secured about the animal. In accordance with hallal provisions, the animal must lay on its right side and its head must face Mecca. In addition, the animal's front and rear legs must be secured. Moreover, the animal's head must be secured by the strap 13 so that its jugular vein can be quickly and cleanly cut.

Figure 3:
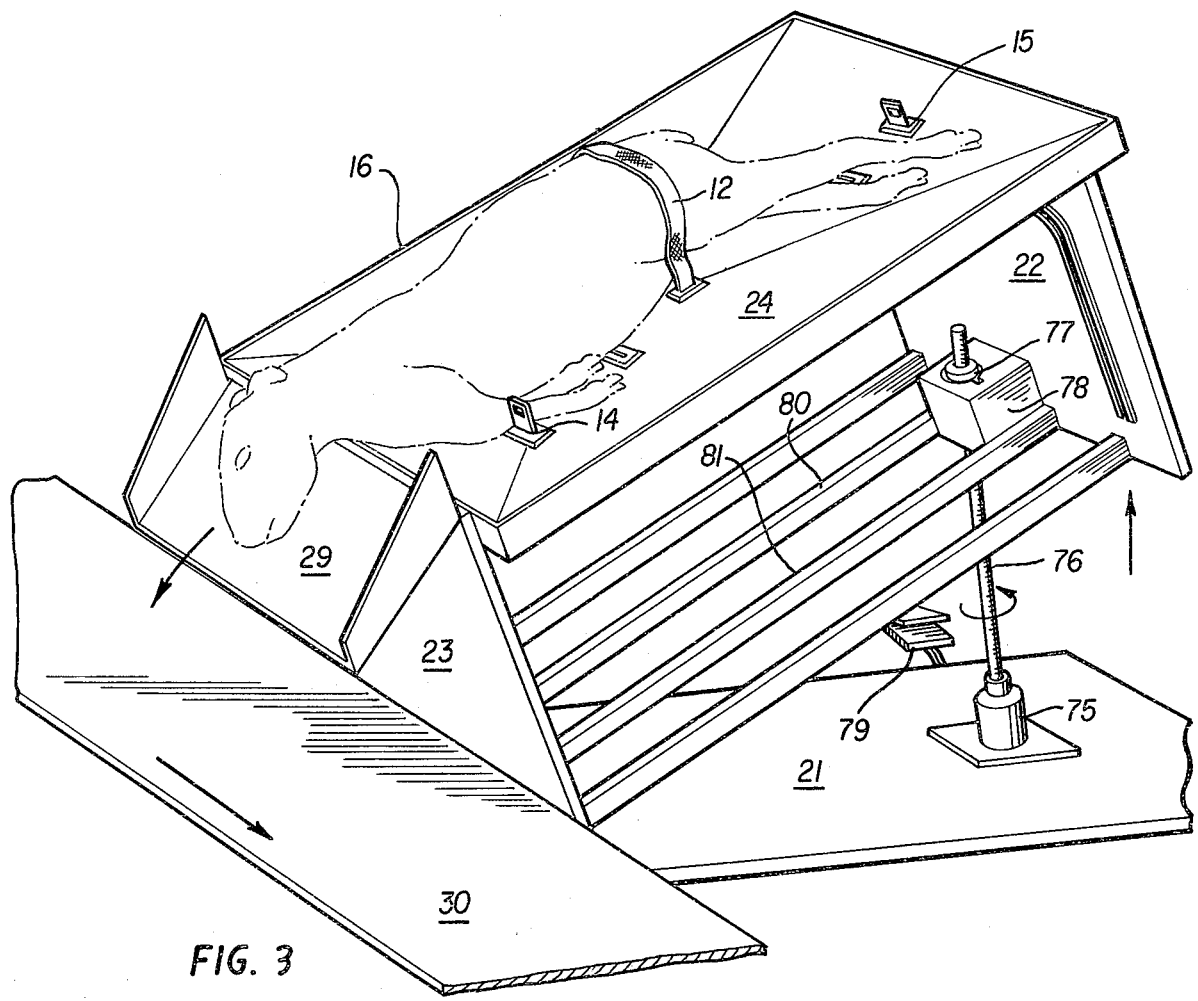
FIG. 3 is a perspective view of the apparatus of FIGS. 1 and 2 showing the table top being tilted about a second axis, normal to the first axis for releasing slaughtered livestock after the livestock is dead and drained of blood so as to deposit the carcass on a conveyor belt.

Referring now to FIG. 3, after the animal has been slaughtered and its blood drained away through hole 26, the carcass is slid from the table top 16 by tilting the table top 16 about a second axis displaced normally with respect to the first axis. The belts 12-15 are then simultaneously released by an operating lever 28 and the carcass 11 slides down a chute 29 onto a conveyor belt 30 which carries the carcass to a butchering area.

Figure 5:
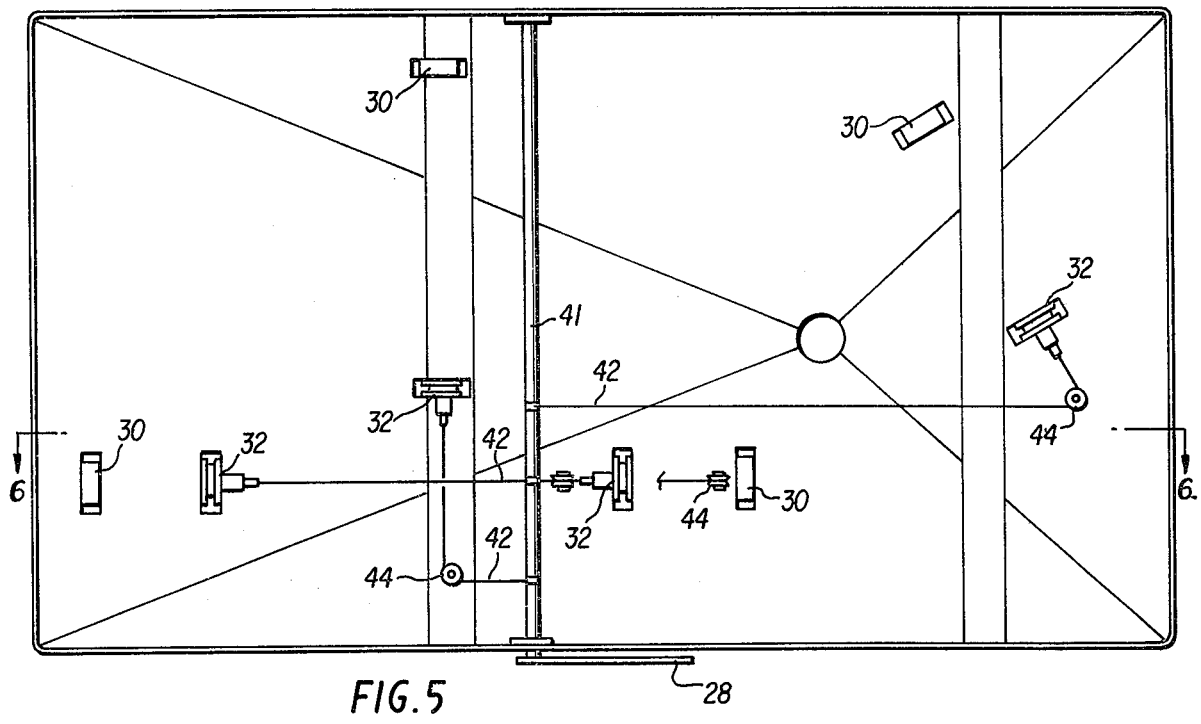
FIG. 5 is a bottom view of the table top of FIGS. 1–4 showing an arrangement for simultaneously releasing all securing straps.
Figure 6:
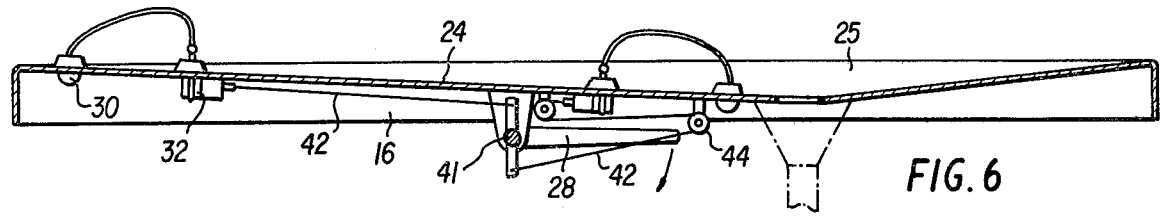
FIG. 6 is a side elevation showing a belt arrangement for rotating the table top.
Figure 7:
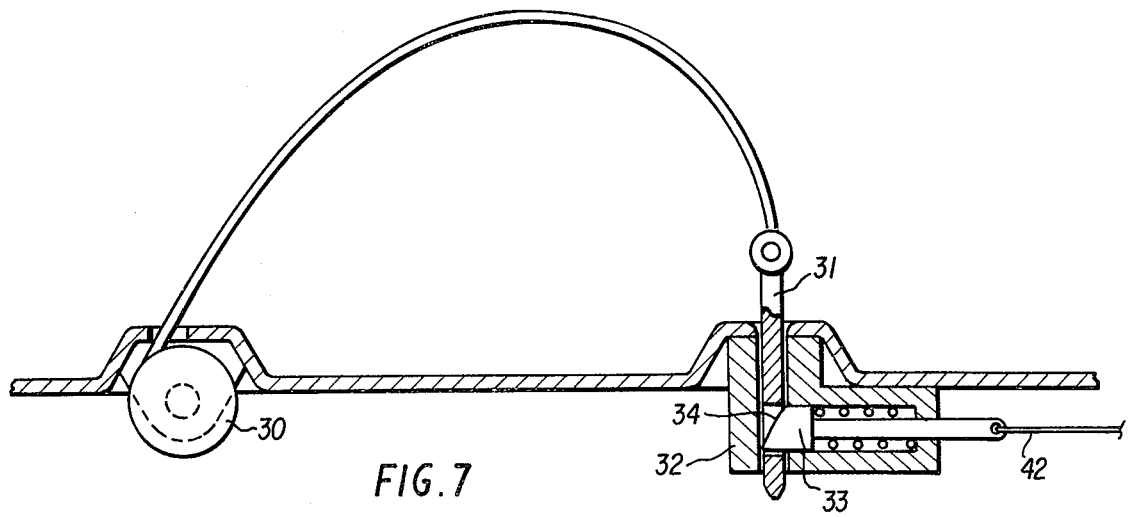
FIG. 7 is an enlarged side elevation showing in detail how each belt is secured.

In a commercial operation, the procedures set forth in FIGS. 1, 2 and 3 are preferably carried out as quickly as possible. As is seen in FIGS. 5, 6 and 7, so each of the straps 12-15 are mounted on a spring reel 30 so as to be spring retracted and to react to loads so as to bind if jerked. The ends of each strap include a hasp 31 which is received in a catch 32 having a spring projected bolt 33. The bolt 33 has a cam surface 34 thereon which the hasp 31 engages to move the bolt back so that the bolt can snap through the opening in the hasp. The straps need only be pulled out away from the table so as to uncoil from the reels and the animal is rapidly secured to the table top 16 upon inserting the hasps. The preferable procedure is to first secure the animal's torso with the strap 12 and thereafter to secure its legs with the straps 14 and 15.

After the animal has been slaughtered, the straps 12, 13, 14 and 15 are released simultaneously by rotating the lever 28 which is secured to an axle 41 to which cables 42 connected to the spring projected bolts 33 are attached. Pulleys 44 are provided for positioning the cables 42 so that by rotating the lever 28 in a downward direction, the cables retract the bolts 33, releasing the hasps 31 and thus the belts 12-15. Since the belts are mounted on spring reels 30, the belts 12-15 will retract, freeing the animal's carcass so that the animal will slide off the table when the table is tilted to the FIG. 3 orientation.

Figure 8:
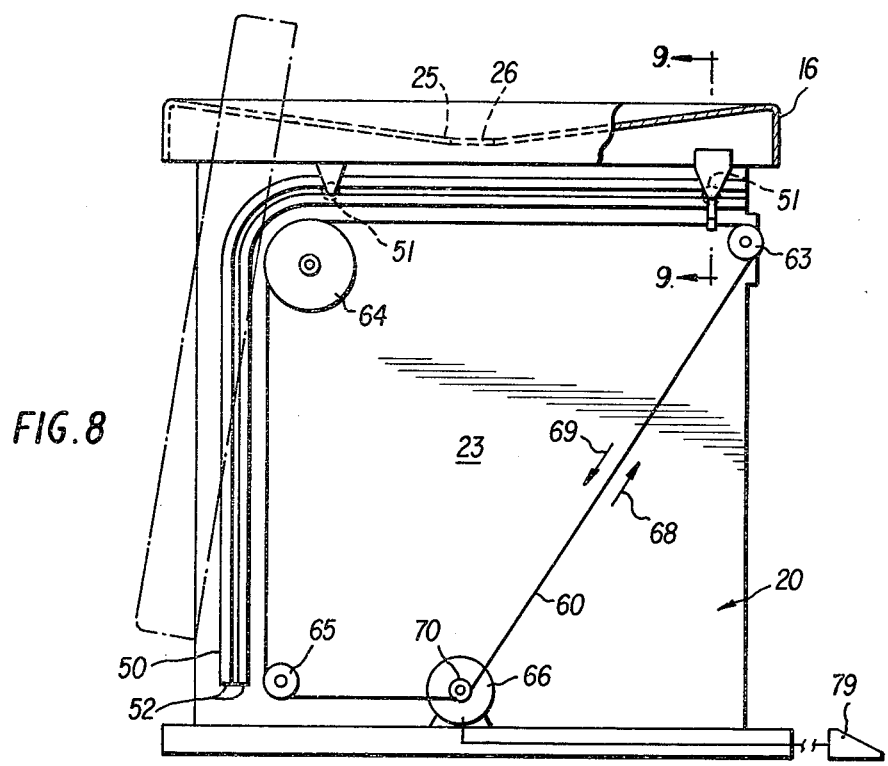
FIG. 8 is a side view showing a cable and pulley arrangement for tilting the table top from the FIG. 1 position to the FIG. 2 position and vice versa.
Figure 9:
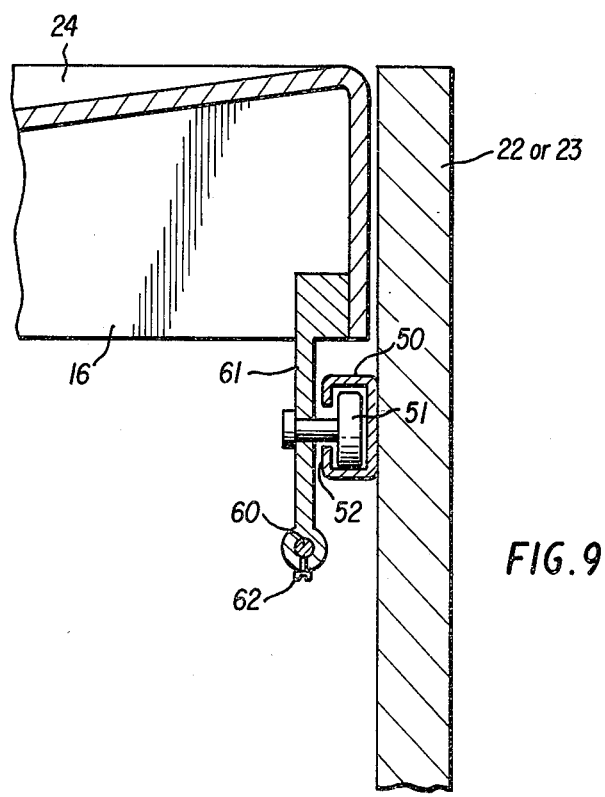
FIG. 9 is an enlarged cross-section showing how the table top is mounted in a track for movement in accordance with the illustration of FIG. 8.

Referring now to FIGS. 8 and 9 in conjunction with FIGS. 1 and 2, an arrangement is shown for moving the table top 16 from the horizontal orientation of FIG. 1 to a vertical orientation of FIG. 2, and vice versa. This is accomplished by mounting the table top 16 within the cradle 20 with a power drive connected therebetween. The front support 23 and rear support 22 each have a track 50 thereon which receives a roller 51 that projects from the table top 16 into the track 50. The tracks 50 have flanges 52 which overlie the roller 51 so as to provide a stable connection between the table top 16 and the front and rear supports 22 and 23.

As is seen in FIG. 8, the table top 16 is moved from the horizontal solid line position (FIG. 1) to the vertical dotted line position (FIG. 2) by a cable 60 secured to a flange 61 fixed to the table top 16 by welding or some other means. The cable 60 can be secured to the flange 61 by any suitable means such as a screw 62. The cable 60 is trained around a series of pulleys 63, 64 and 65 and is driven by an electric motor 66 in the direction of arrow 68 to move from the horizontal to the vertical position and in the direction of arrow 69 to move from the vertical position to the horizontal position. Instead of a cable 60, a chain may be utilized to insure positive motion by connecting the chain to the motor 66 via a sprocket 70. Preferably, the motor 66 is activated by a reversible pedal-operated switch 74 which, when pressed, causes the motor to run in the clockwise direction and, when pressed again, causes the motor to run in the counterclockwise direction. Accordingly, a single switch can rapidly move the animal from the FIG. 2 position to the FIG. 1 position.

Tilting of the table about its second axis as is shown in FIG. 3 is accomplished by energizing a motor 75 which rotates a screw 76 threaded through a lug 77. The lug 77 is pivoted in a sliding block 78 which slides slightly on rails 80 and 81 that extend between the rear support 22 and front support 23 of the cradle. Again, the motor 75 is operated by a reversing switch 79 which rotates the screw 76 in one direction to tilt the cradle 20 and the table top 16 to the FIG. 3 position and in the opposite direction to return the cradle and table top to the FIG. 1 position upon being subsequently pressed.

Figure 10:
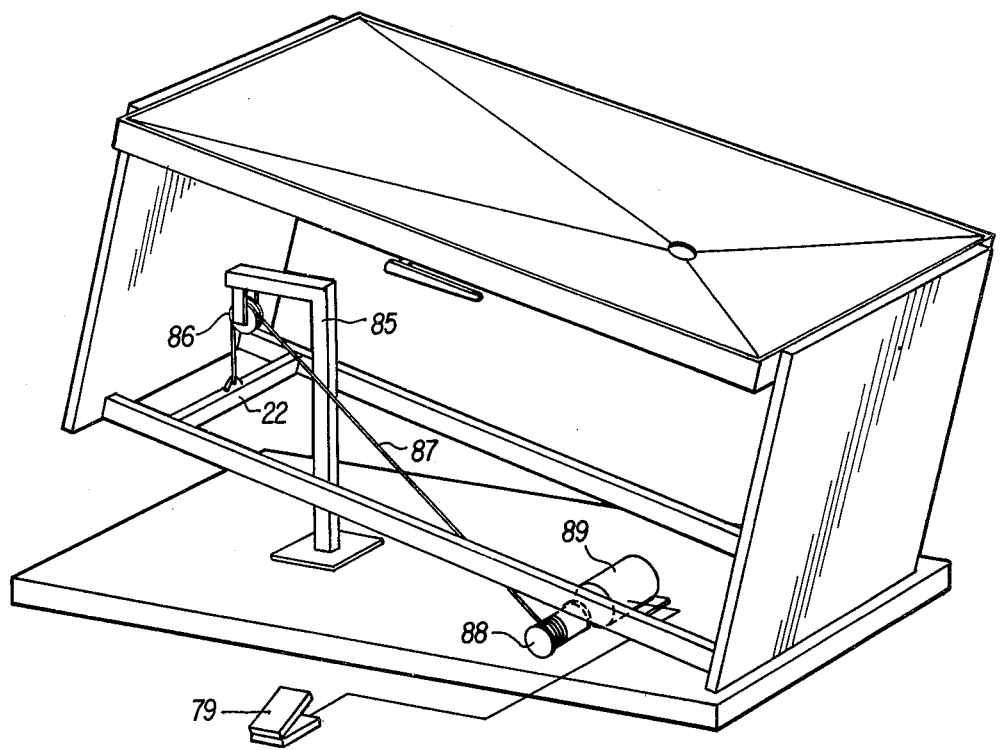
FIG. 10 is a front view showing an alternative arrangement for lifting the table top about the second axis as shown in FIG. 3.

As is seen in FIG. 10, an alternative arrangement may be used to hoist the table from its FIG. 1 position to the FIG. 3 position. In this alternative arrangement, a pedestal 85 is provided which has a pulley 86 thereon around which a cable 87 is directed. One end of the cable 87 is attached to the bottom of rear end 22 of the table, and the other end of the cable 87 is attached to a drum 88. The drum 88 is driven by a motor 89 to wind up the cable 87 and raise the table when rotated in one direction. When reversed, the cable 87 lowers the table to the FIG. 1 position.

Figure 4:
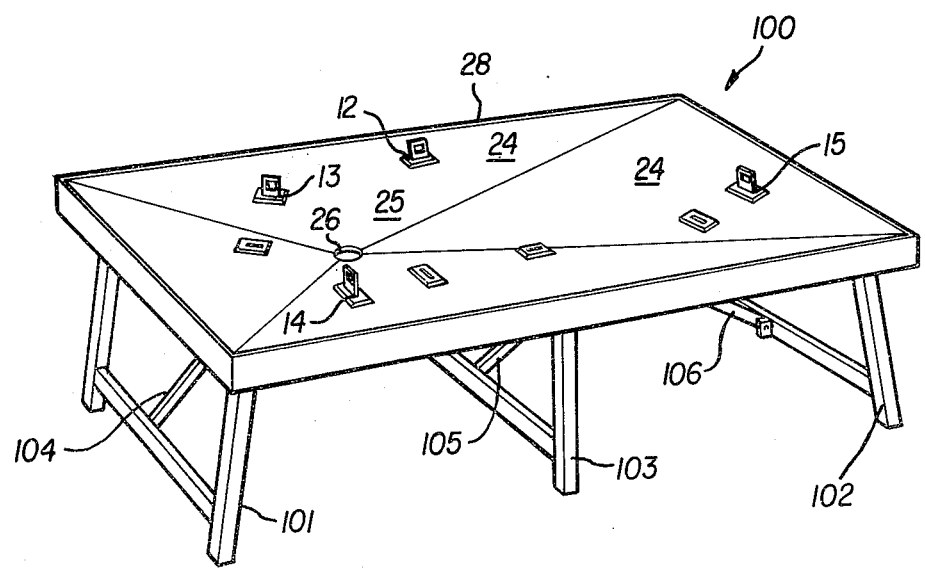
FIG. 4 is a perspective view of a second embodiment of the instant invention.

Referring now to FIG. 4 where a second embodiment of the invention is illustrated, a table 100 is supported in the horizontal position by folding legs 101, 102 and 103. The legs 101, 102 and 103 are held extended by pairs of links 104, 105 and 106, respectively. The table includes an upper surface 24 with a concavity 25 and a hole 26 just as set forth in the first embodiment. Moreover, straps 12-15 are used to restrain an animal just as set forth in the first embodiment. In the embodiment of FIG. 4, the straps 12-15 are released by an operating lever 28. When the table 100 is not being used, the legs 101, 102 and 103 are folded against the bottom surface of the table, and the table can be stored while resting on the one end or edge.

The foregoing embodiments are for the purposes of illustration only. The invention is to be limited only by the following claims:

What is claimed is:

1. Apparatus for restraining an animal during slaughter according to hallal or Kosher provisions, the apparatus comprising:
    a table top having a generally concave surface with a drain at the lowest point thereof through which the blood of the slaughtered animal drains; and
    a plurality of spaced strapping means comprising straps each secured to the table at one end and each having a free end retained by individual releasable latching means wherein two of the straps are positioned for restraining the animal's legs, one strap is positioned for restraining the animal's torso and one strap is positioned for restraining the animal's head; and
  single operating means connected to the latching means for releasing simultaneously the latching means securing the animal after the animal has been slaughtered.

2. The apparatus of claim 1 further including foldable legs whereby the apparatus can be conveniently stored when not in use.

3. The apparatus of claim 1 further including support means for pivoting the table top between a vertical orientation used to secure the animal to the table top and a horizontal orientation for slaughtering the animal.

4. The apparatus of claim 3 further including means for tilting the table top from the horizontal position to a second position, different from the vertical orientation, wherein the second position has a vertical component whereby the animal is slid from the table top for subsequent butchering.

5. The apparatus of claim 4 further including conveyor means positioned adjacent to the apparatus for carrying the slaughtered animal away from the apparatus.

6. The apparatus of claim 4 further including means for tilting the table top about a first axis to assume the vertical orientation for securing of the animal thereto and means for tilting the table top about a second axis, normal to the first axis, for sliding the animal therefrom.

7. The apparatus of claim 6 wherein means for tilting the table top about the first axis comprises a pair of spaced front and rear end supports each having a track thereon which extends horizontally and curves downwardly to extend vertically and wherein the table top has rollers which are received in the tracks and are restrained by the tracks as the table is tilted from the horizontal position to the vertical position.

8. The apparatus of claim 7 wherein the means for tilting the table top about the second axis comprises elevator means for lifting one end of the table top relative to the other end to rotate the table top about the second axis which second axis is normal to the first axis.

9. The apparatus of claim 8 wherein the elevator means comprises a pedestal adjacent to the table top and a lug thereon connecting the table top to the pedestal and means for lifting the lug relative to the pedestal.

10. The apparatus of claim 9 further including motorized means for moving a table from the horizontal position to the vertical position and vice versa wherein said motorized means includes a flexible drive connected to the sides of the table.

11. The apparatus of claims 1, 2, 3, 4, 5, 6, 7, 8 or 9 further including reel means for automatic retraction of the strapping means once the strapping means are released after the animal is slaughtered.

* * * * *